United States Patent
Lemay et al.

(10) Patent No.: US 9,965,407 B2
(45) Date of Patent: May 8, 2018

(54) TASK MANAGEMENT

(71) Applicant: Hewlett Packard Enterprise Development LP, Houston, TX (US)

(72) Inventors: Kevin Lemay, Roseville, CA (US); Sukhinder Singh Sahota, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 184 days.

(21) Appl. No.: 15/163,309

(22) Filed: May 24, 2016

(65) Prior Publication Data
US 2017/0344499 A1 Nov. 30, 2017

(51) Int. Cl.
| G06F 13/00 | (2006.01) |
| G06F 13/16 | (2006.01) |
| G06F 13/40 | (2006.01) |
| G06F 9/48  | (2006.01) |

(52) U.S. Cl.
CPC ........ G06F 13/1642 (2013.01); G06F 9/4812 (2013.01); G06F 13/4068 (2013.01)

(58) Field of Classification Search
None
See application file for complete search history.

(56) References Cited

U.S. PATENT DOCUMENTS

| 7,742,411 B2    | 6/2010  | Trinh et al.    |
| 8,150,935 B2    | 4/2012  | Mizrachi et al. |
| 2011/0246677 A1 | 10/2011 | Johnson et al.  |
| 2014/0281349 A1 | 9/2014  | Peters          |

FOREIGN PATENT DOCUMENTS

DE          10049863 A1    4/2002

OTHER PUBLICATIONS

Deri, L. et al., "Exploiting Commodity Multi-Core Systems for Network Traffic Analysis," (Research Paper), Jul. 15, 2010, 11 pages, available at http://luca.ntop.org/MulticorePacketCapture.pdf.

*Primary Examiner* — Hyun Nam
*Assistant Examiner* — Juanito Borromeo
(74) *Attorney, Agent, or Firm* — Hewlett Packard Enterprise Patent Department

(57) ABSTRACT

In one example, place IO commands on queues which is to cause an application module to initiate IO operations, place task management commands on queues which is to cause the application module to initiate task management operations including sending task marker requests to the target interface module, place task marker on respective queues responsive to task marker requests associated with the task management commands, and receive a task marker completion message indicating receipt of IO commands and task management commands associated with the task marker requests.

20 Claims, 6 Drawing Sheets

TASK MANAGEMENT

BACKGROUND

Computer network systems may include computer networks to provide communication paths between host computing devices and storage devices. The computer networks may allow physical storage devices to appear as virtual storage space to the host computing devices.

BRIEF DESCRIPTION OF THE DRAWINGS

Examples are described in the following detailed description and in reference to the following drawings.

DETAILED DESCRIPTION

Figure 1:
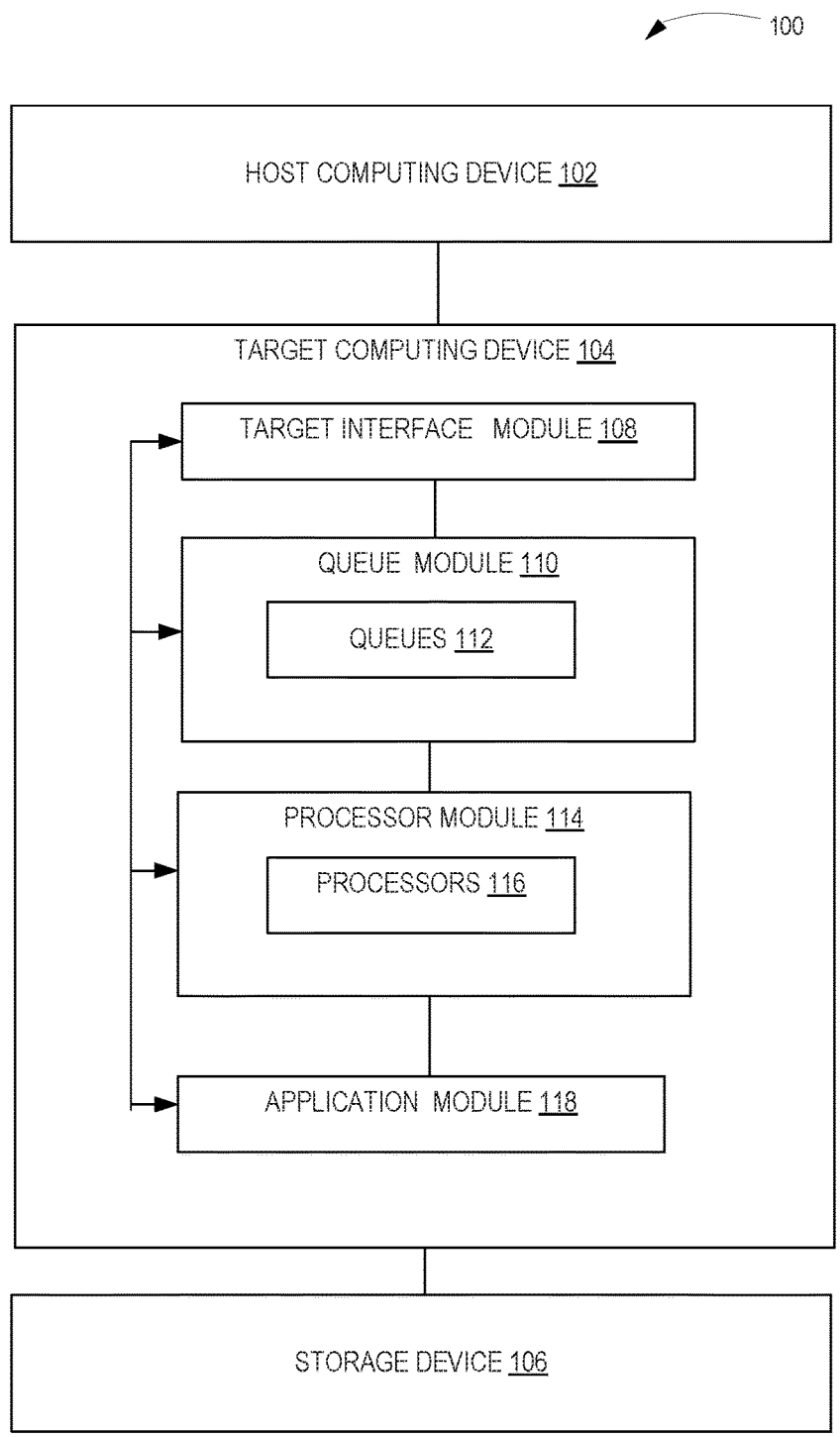
FIG. 1 depicts an example computer system for task management.

Computer network systems may include computer networks with target computing devices to provide communication paths to exchange information such as data and commands between host computing devices and storage devices. The computer networks may allow physical storage devices to appear as virtual storage space to the host computing devices.

A target computing device may include an application module to implement a single queue pair (which includes an inbound queue and an outbound queue) to process Input/Output (IO) commands received from the host computing device. The target computing device may include a target interface module, such as a Host Bust Adapter (HBA), to handle receipt of the IO commands from the host computing device. In another example, the target computing device may include a disk array controller to manage exchange of data between the host computing device and the storage device. In one example, the target computing device may include an application module to provide support or functionality to manage exchange of data and may include an application program, an Operating System (OS), a device driver and the like or a combination thereof.

When an incoming or input command is received, the target interface module places the command on the inbound queue and generates or raises an interrupt to the application module so it can process the command. When the application module has the available data corresponding to the IO command, it places an appropriate command along with the data and status as needed on the outbound queue and notifies the target interface module to initiate the transfer to the host computing device. On completion of the transfer, the target interface module notifies the application module by placing a completion command or notification on the queues and generates an interrupt the application module. In this case, the queue pairs may be bound to an interrupt, however with increasing speed requirements of the target interface module, this may result in saturation of processor capability and therefore may limit the performance of the system.

In one example, a target computing device may employ multiple queues which may be bound or associated with interrupts on different processors in a multiple processor system which may help spread or distribute the load across the different processors. However, the use of multiple queues may require additional synchronization functionality to help ensure that task management commands are handled properly. In one example, a host computing device may employ task management commands to perform any necessary operations or functions associated with other commands such as IO commands. In one example, task management commands may initiate recovery actions in the event of command timeout or other various failures. Task management operations may require that the target computing device perform all target clean-up operations within the scope of the task management command before sending a completion response indicating completion of the task management command.

In another example, target computing device may employ a single queue. In this case, since both IO commands and task management commands are placed on the same queue, the process is ordered and therefore the application module may only need to inspect all commands that arrived prior to the task management before sending a response back to the host computing device. However, in a target computing device with a multiple queues, ordering may not be guaranteed as different processors may be processing their respective queues. It may also be possible that an interrupt may be pending (not recognized or identified by the application module) and there may be commands pending on that queue that falls within the scope of the task management command which is already being processed on another queue by a different processor.

In one example, a target computing devices may bind host computing devices to respective queues to help enforce or ensure ordering of the IO commands with respect to the task management commands. However, this may result in unbalanced interrupt load if some host computing devices are more active compared to others which may cause a system processing imbalance and processor saturation.

To help address this and help improve performance of the system, the present disclosure provides techniques which may help to ensure that IO interrupt load distribution is balanced across all queues in a multiple queue environment while helping ensure IO commands within the scope of the task management commands have been processed before task management completion response is sent back to the host computing device. In one example, the target computing device may configure the target interface module to allow the incoming commands (data traffic of IO commands and task commands) to be split or divided into multiple receive queues. In some examples, the target interface module may be configured to divide the stream of input commands based on policies such as round robin, source/destination and the like such that policies help spread or distributed the load evenly across the processors. In one example, the target computing device employs task markers or queue markers. When a task management request is received, the system issues a request to place a task marker in each queue which causes the system to generate an interrupt to respective processors associated with the queue. When the marker is received on all queues by the application module, then the task management request may be processed because it may help ensure that all affected commands have been received and processed in a similar manner as in the system with a single queue.

In one example, the present techniques may help to ensure that IO interrupt load distribution is balanced across queues while ensuring IO commands within the scope of the task management commands are processed before task management completion response is sent back to the host computing device. In one example, a target computing device is configured to receive IO commands from a host computing device and place the IO commands on respective queues from a plurality of queues which is to cause an application module to initiate IO operations. The target computing device receives task management commands from the host computing device and places the task management commands on respective queues which is to cause the application module to initiate task management operations including send task marker requests to the target interface module. The target computing device places task marker on respective queues responsive to task marker requests associated with the task management commands from the application module. The target computing device receives a task marker completion message indicating receipt of IO commands and task management commands associated with the task marker requests.

In this manner, the present disclosed techniques may help improve performance of the system. In one example, the present disclosure provides techniques which may help to ensure that improve IO interrupt load distribution is balanced across all queues in a multiple queue environment while ensuring IO commands within the scope of the task management commands have been processed before task management completion response is sent back to the host computing device.

FIG. 1 depicts an example computer system 100 for task management. The computer system 100 includes a target computing device 104 to provide communication paths between a host computing device 102 and storage device 106. As explained below in further detail, in one example, target computing device 104 provides task management functionality which may help to improve performance of system 100. In one example, target computing device may help IO interrupt load distribution balance across all queues in a multiple queue environment while helping to ensure IO commands within the scope of the task management commands have been processed before task management completion response is sent back to the host computing device. It should be understood that system 100 is for illustrative purposes and that different configurations may be employed to practice the present techniques. For example, computer system 100 may include a plurality of host computing devices 102, a plurality of target computing devices 104 and a plurality of storage devices 106 to practice the present techniques.

In one example, target computing device 104 includes a queue module 110 that comprises a plurality of queues 112. The queue module 110 and plurality of queues 112 may be any data structure or managing commands and the like. In one example, queues 112 may include a circular queue structure. The target computing device 104 includes a processor module 114 that comprises a plurality of processors 116. The processor module 114 and plurality of processors 116 may be processing resources 400 as explained below. In one example, a processing resource 400 may include other electronic circuitry suitable for the retrieval and execution instructions stored on a machine readable medium, or a combination thereof. The target computing device 104 includes an application module 118 which include functionality to process commands from host computing device 102. In one example, application module 118 may provide functionality to process IO commands and task management commands. In one example, application module may be implemented as an application program, Operating System (OS), device driver and the like or a combination thereof.

The target interface module 108 includes functionality to manage communication between host computing device 102 and storage device 106. In one example, target interface module 108 may be configured to receive, from host computing device, Input/Output (IO) commands to perform IO operations between the host computing device and storage device 106. In one example, in response to receipt, of the IO commands, target interface module 108 places the received IO commands on respective queues 112 of the plurality of queues which is to cause generation of interrupts to respective processors 116 and to cause application module 118 to initiate IO operations.

In one example, target interface module 108 may be configured to receive, from host computing device 102, task management commands to perform task management operations. In response to receipt of the task management commands, target interface module 108 places the task management commands on respective queues 112 which is to cause interrupts to respective processors 116 and to cause application module 118 to initiate task management operations including to send task marker requests to the target interface module.

In one example, target interface module 108 may be configured to receive, from application module 118, task marker requests associated with the task management commands and place corresponding task markers on respective queues 112. In one example, target interface module 108 may, in response to receipt of the task marker requests, place corresponding task marker on respective queues 112.

In one example, target interface module 108 may be configured to receive, from application module 118, a task marker completion message indicating receipt of IO commands and task management commands associated with the task marker requests. In another example, when a task management request is received, computing device 104 issues a request to place a task marker in each queue 112 which causes the system to generate an interrupt to respective processors associated with the queue. When the marker is received on all queues 112 by application module 118, then the task management request may be processed because it may help ensure that all affected commands have been received and processed.

In this manner, in one example, the present disclosure provides techniques which may help to ensure that improve IO interrupt load distribution is balanced across all queues in a multiple queue environment while ensuring IO commands within the scope of the task management commands have been processed before task management completion response is sent back to the host computing device.

In another example, target computing device 104 may be configured to process commands from application module 118. In one example, after application module 118 sends the task marker completion message, the application module proceeds to process the task management commands associated with the IO commands. In another example, after application module 118 completes the task management commands associated with the IO commands, the application module sends to target interface module 108 a task management command complete message.

In another example, target computing device 104 may be configured to receive commands from host computing device 102. For example, target interface module 108 may receive, from host computing device 102, IO commands that include at least one of a read command to cause application module 118 to read data from storage device 106 and return the data to the host computing device. In another example, target interface module 108 may receive, from host computing device 102, IO commands that include at least one of a write command to cause application module 118 to write data from host computing device 102 to storage device 106. In another example, target interface module 108 may be configured to receive the IO commands and the task management commands as a stream of commands and then divide the commands so that a first stream of the commands is processed by a first queue and a second stream of the commands is processed by a second queue.

The target computing device 104 may be configured to receive task commands from host computing device 102. In one example, the task management commands comprise commands to perform operations associated with the IO commands. In one example, task management commands may be used to initiate recovery actions in the event of IO command timeout or other various failures. Task management operations may require that the target computing device 104 perform all target clean-up operations within the scope of the task management command before sending a completion response indicating completion of the task management command.

The target computing device 104 is to provide an interface between host computing device 102 and storage device 106. In one example, target interface module 108 comprises a Host Bus Adapter (HBA) to interface IO commands between the host computing device and the storage device.

In one example, storage device 106 may comprise any electronic device for processing data and for means to store data for later retrieval. For example, storage device 106 may include machine readable medium executable by a processor or processing resources as described below. The storage device 106 may include storage volumes which may by logical units of data that can be defined across multiple storage devices. The storage device 106 may receive, from target computing device 104, IO requests or commands which may include requests to read data from host computing device as volumes and requests to write data to the storage devices as volumes. The storage device 106 may comprise physical storage elements, such as a disk-based storage elements (e.g., hard disk drives, optical disk drives, etc.) or other type of storage elements (e.g., semiconductor storage elements). In one example, multiple storage devices within a storage subsystem can be arranged as an array configuration.

The target computing device 104 may comprise any electronic device for processing data and for means to store data for later retrieval. The target computing device 104 may include functionality to communicate with other target computing devices or storage devices 106 or host computing devices 102 over a network using network and communication techniques. The network techniques may include any means of electronic or data communication. The network may include a local area network, Internet and the like. The network techniques may include Fibre Channel (FC) network, SCSI (Small Computer System Interface) link, iSCSI (Internet Small Computer System Interface) link, FCoE (Fibre Channel over Ethernet) link and the like. The network techniques also may employ other network components such as switches, expanders, concentrators, routers, and other communications devices.

In one example, system 100 may be configured as a Storage Area Network (SAN) with storage device 106 for network communication. It should be understood that system 100 of FIG. 1 may be configured as a SAN and may include additional elements and that some of the elements depicted herein may be removed and/or modified without departing from a scope of the SAN. The system 100 configured as a SAN may be used to provide dedicated networks that provides access to consolidated data storage. The SAN may be used to enhance storage devices, such as disk arrays, tape libraries, and optical jukeboxes, accessible to servers so that the devices appear like locally attached devices to the operating system of a computing device. A SAN can include a network of storage devices that are generally not accessible through a Local Area Network (LAN) by other devices.

The system 100 of FIG. 1 shows an example system 100 for task management and should be understood that other configurations may be employed to practice the present techniques. The components of system 100 may be implemented in hardware, software or a combination thereof. For example, system 100 may be configured to process task management commands from a plurality of host computing devices 102 to communicate with a plurality of storage devices 106. In one example, target computing device 104 may be implemented in hardware, software or a combination thereof. In another example, the functionality of the components of system 100 may be implemented using technology related to Personal Computers (PCs), server computers, tablet computers, mobile computers and the like.

FIG. 1 shows a system 100 to provide task management. The system 100 may include machine readable medium comprising (e.g., encoded with) instructions executable by a processor or processing resources to implement functionalities described herein in relation to FIG. 1. In some examples, the functionalities described herein in relation to instructions to implement task management, and any additional instructions described herein in relation to machine readable medium, may be implemented as engines or modules comprising any combination of hardware and programming to implement the functionalities of the modules or engines, as described herein. The functionality of the present techniques may be implemented by a computing device which may be a server, blade enclosure, desktop computer, laptop (or notebook) computer, workstation, tablet computer, mobile phone, smart device, or any other processing device or equipment including a processing resource or processor. In examples described herein, a processor may include, for example, one processor or multiple processors included in a single computing device or distributed across multiple computing devices.

Figure 2:
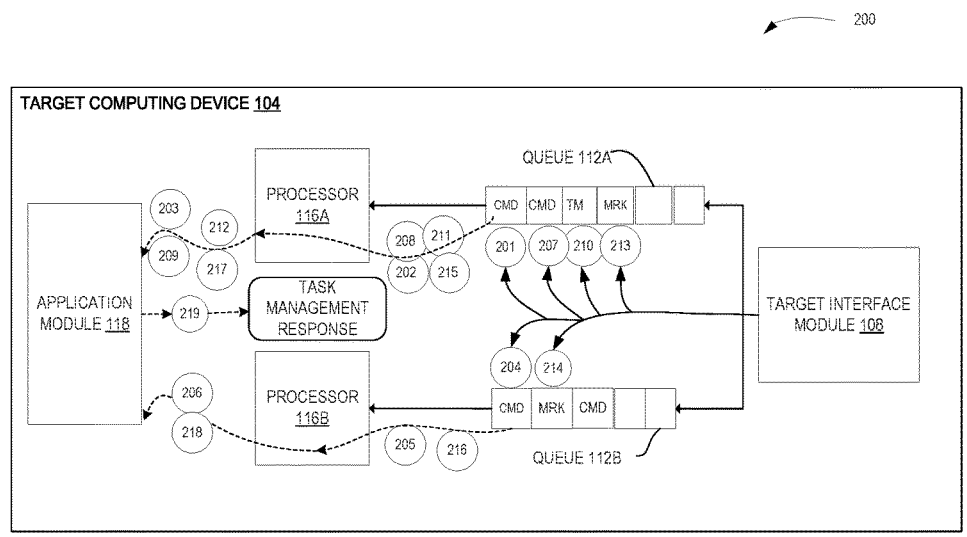
FIG. 2 depicts another example computer system for task management.

FIG. 2 depicts another example system 200 for task management. To illustrate operation, it may be assumed that system 200 employs target computing device 104 for providing task management functionality between host computing device 102 and storage device 106 according to the present techniques described herein. In one example, it may be assumed that target computing device 104 configures queue module 110 to have a first queue 112A and a second queue 112B. In a similar manner, it may be assumed that target computing device 104 configures processor module 114 to have a first processor 116A and a second processor 116B.

At block 201, to illustrate operation, target interface module 108 receives, from host computing device 102, a first IO command to perform IO operations between the host computing device and storage device 106. Processing proceeds to block 202, where target interface module 108 places the first received IO command on first queue 112A which causes generation of a first interrupt to first processor 116A. Processing proceeds to block 203, where first interrupt to first processor 116A causes application module 118 to initiate IO operations associated with the first IO command.

At block 204, in a similar manner to block 201 above, target interface module 108 receives, from host computing device 102, a second IO command to perform IO operations between the host computing device and storage device 106. Processing proceeds to block 205, where target interface module 108 places the second received IO command on second queue 112B which causes generation of a second interrupt to second processor 116B. Processing proceeds to block 206, where second interrupt to second processor 116B causes application module 118 to initiate IO operations associated with the second IO command.

At block 207, in a similar manner to block 201 above, target interface module 108 receives, from host computing device 102, a third IO command to perform IO operations between the host computing device and storage device 106. Processing proceeds to block 208, where target interface module 108 places the third received IO commands on first queue 112A which causes generation of a third interrupt to first processor 116A. Processing proceeds to block 209, where third interrupt to first processor 116A causes application module 118 to initiate IO operations associated with the third IO command.

At block 210, target interface module 108 receives, from host computing device 102, a task management command to perform task management operations. At block 211, in response to receipt of the task management commands, target interface module 108 places the task management command on first queue 112A. The task management command is associated with the IO commands including the first IO command, the second IO command and third IO command. In response to placement of the task management command on first queue 112A, an interrupt is generated directed to first processor 116A which cause application module 118 to initiate task management operations.

At block 212, application module 118 initiates task management operations which includes sending task marker requests to target interface module 108. The target interface module 108 receives, from application module 118, the task marker requests associated with the task management commands.

At block 213, in response to receipt of the task marker request, target interface module 108 places a first task marker on first queue 112A. At block 214, in a similar manner, target interface module 108 places second task marker on second queue 112B.

At block 215, in response to target interface module 108 placing first task marker on first queue 112A (block 213), an interrupt is generated directed to first processor 116A which causes application module 118 to process the task marker interrupt. At block 216, in a similar manner, in response to target interface module 108 placing second task marker on second queue 112B (block 214), an interrupt is generated directed to second processor 116B which causes application module 118 to process the task marker interrupt.

At block 217, target interface module 108 receives, from application module 118, a task marker completion message indicating receipt of IO commands and task management commands associated with the task marker requests and associated with the first queue. In this case, the marker requests are still outstanding. At block 218, target interface module 108 receives, from application module 118, a task marker completion message indicating receipt of IO commands and task management commands associated with the task marker requests and associated with the second queue. In this case, all of the markers are received. In addition, application module 118 completes all of the IO commands associated with the task management commands.

At block 219, once application module 118 completes all of the IO commands associated with the task management commands, the application module sends target interface module 108 a task management command complete message.

In this manner, in one example, the present disclosure provides techniques which may help to ensure that improve IO interrupt load distribution is balanced across all queues in a multiple queue environment while ensuring IO commands within the scope of the task management commands have been processed before task management completion response is sent back to the host computing device.

The process 200 of FIG. 2 shows an example process and it should be understood that other configurations may be employed to practice the present techniques described herein. For example, process 200 may be configured to process task management commands from a plurality of host computing devices to communicate with a plurality of storage devices 106.

Figure 3A:
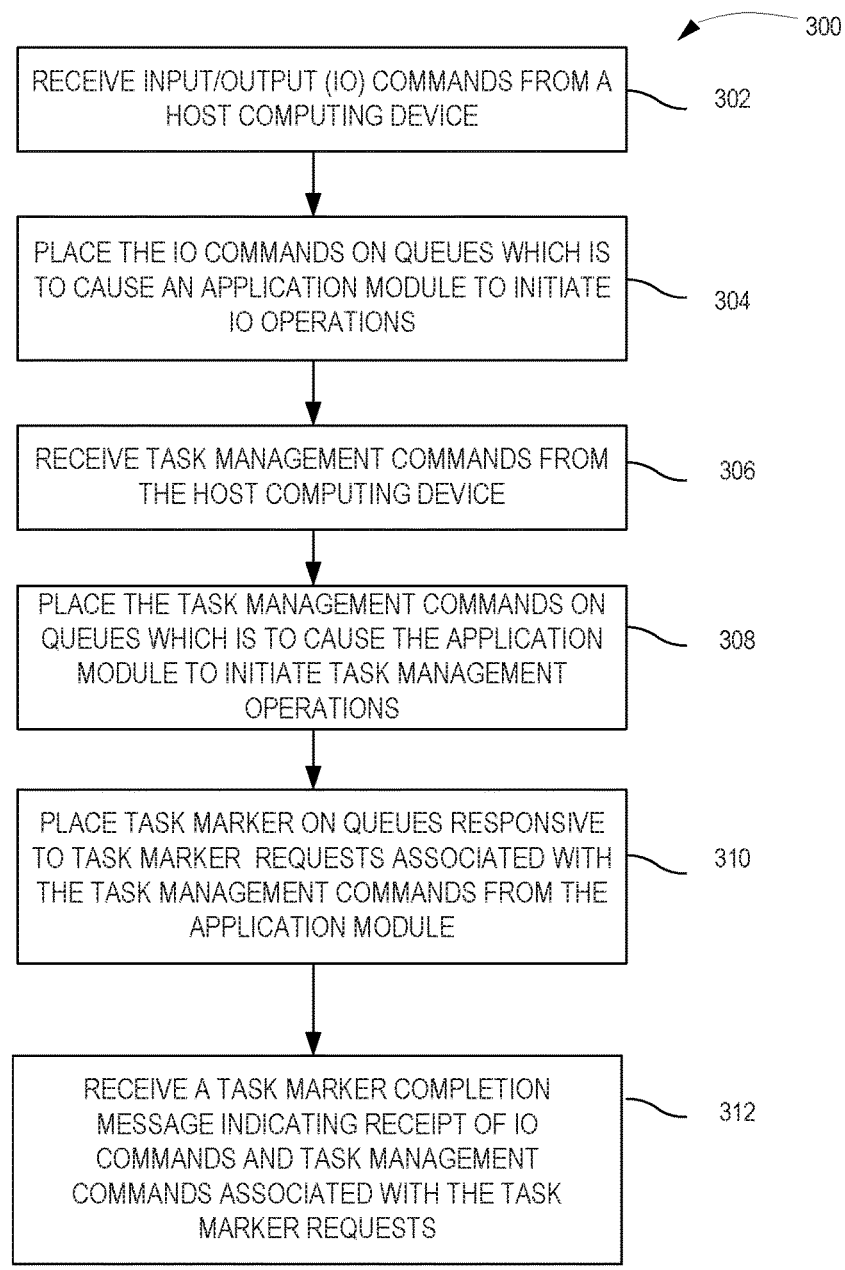
FIG. 3A depicts an example flow chart of a process for task management.

FIG. 3A depicts an example flow chart 300 for a process for task management. To illustrate operation, it may be assumed that process 300 employs system 100 which includes a target computing device 104 for providing task management functionality between host computing device 102 and storage device 106 according to the present techniques described herein.

It should be understood the process depicted in FIG. 3A represents generalized illustrations, and that other processes may be added or existing processes may be removed, modified, or rearranged without departing from the scope and spirit of the present disclosure. In addition, it should be understood that the processes may represent instructions stored on a machine readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, Application Specific Integrated Circuits (ASICs), or other hardware components associated with the system. Furthermore, the flow charts are not intended to limit the implementation of the present techniques, but rather the flow charts illustrate functional information to design/fabricate circuits, generate software, or use a combination of hardware and software to perform the illustrated processes.

The process 300 may begin at block 302, wherein target interface module 108 receives IO commands from host computing device 102. Processing proceeds to block 304.

At block 304, target interface module 108 places the received IO commands on queues 112 which is to cause application module 118 to initiate IO operations. Processing proceeds to block 306.

At block 306, target interface module 108 receives task management commands from host computing device 102. Processing proceeds to block 308.

At block 308, target interface module 108 places the task management commands on queues 112 to cause application module 118 to initiate task management operations including to send task marker requests to the target interface module. Processing proceeds to block 310.

At block 310, target interface module 108 receives task marker requests associated with the task management commands and places corresponding task markers on respective queues 112. Processing proceeds to block 312.

At block 312, target interface module 108 receives task marker completion message indicating receipt of IO commands and task management commands associated with the task marker requests.

In this manner, in one example, the present disclosure provides techniques which may help to ensure that improve IO interrupt load distribution is balanced across all queues in a multiple queue environment while ensuring IO commands within the scope of the task management commands have been processed before task management completion response is sent back to the host computing device.

The process 300 of FIG. 3A shows an example process and it should be understood that other configurations may be employed to practice the present techniques described herein. For example, process 300 may be configured to process task management commands from a plurality of host computing devices to communicate with a plurality of storage devices 106.

Figure 3B:
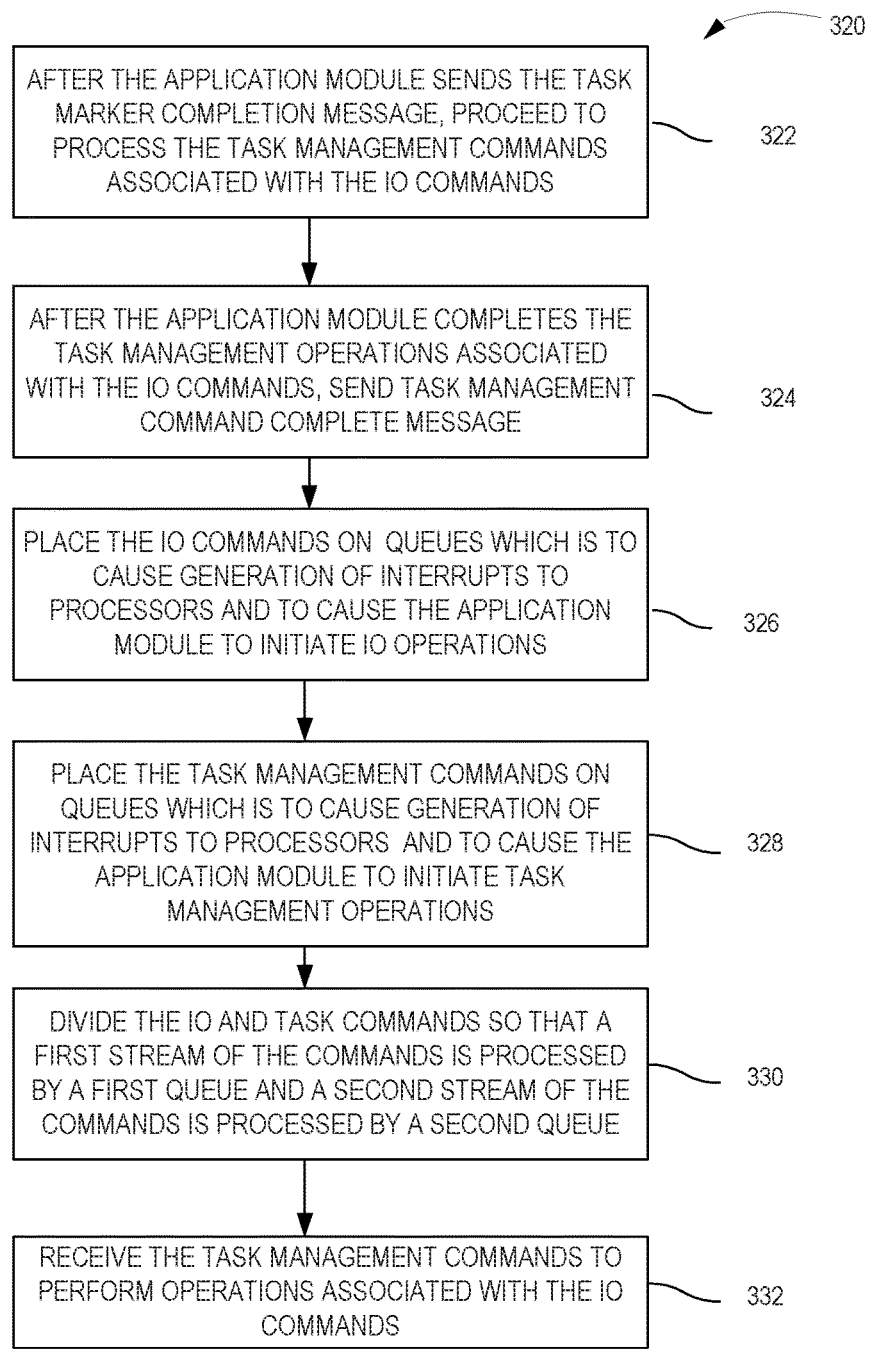
FIG. 3B depicts another example flow chart of a process for task management.

FIG. 3B depicts another example flow chart 320 for task management. To illustrate operation, it may be assumed that process 320 employs system 100 which includes a target computing device 104 for providing task management functionality between host computing device 102 and storage device 106 according to the present techniques described herein.

In one example, process 320 includes process blocks of FIG. 3A and are not repeated here for simplicity of description.

Processing proceeds to block 322, wherein, after application module 118 sends the task marker completion message, the application module to proceed to process the task management commands associated with the IO commands.

At block 324, after application module 118 completes the task management operations associated with the IO commands, the application module sends to the interface module a task management command complete message.

At block 326, target interface module 108 places the IO commands on respective queues which is to cause generation of interrupts to respective processors of plurality of processors 116 and to cause application module 118 to initiate IO operations.

At block 328, target interface module 108 places task management commands on respective queues 116 which is to cause generation of interrupts to respective processors of plurality of processor and to cause application module 118 to initiate task management operations.

At block 330, target interface module 108, receives the IO commands as a stream of commands and then divides the commands so that a first stream of the commands is processed by a first queue and a second stream of the commands is processed by a second queue.

At block 332, target interface module 108, receives the task management commands to perform operations associated with the IO commands.

The process 320 of FIG. 3B shows an example process and it should be understood that other configurations may be employed to practice the present techniques described herein. For example, process 320 may be configured to process task management commands from a plurality of host computing devices to communicate with a plurality of storage devices 106.

Figure 4A:
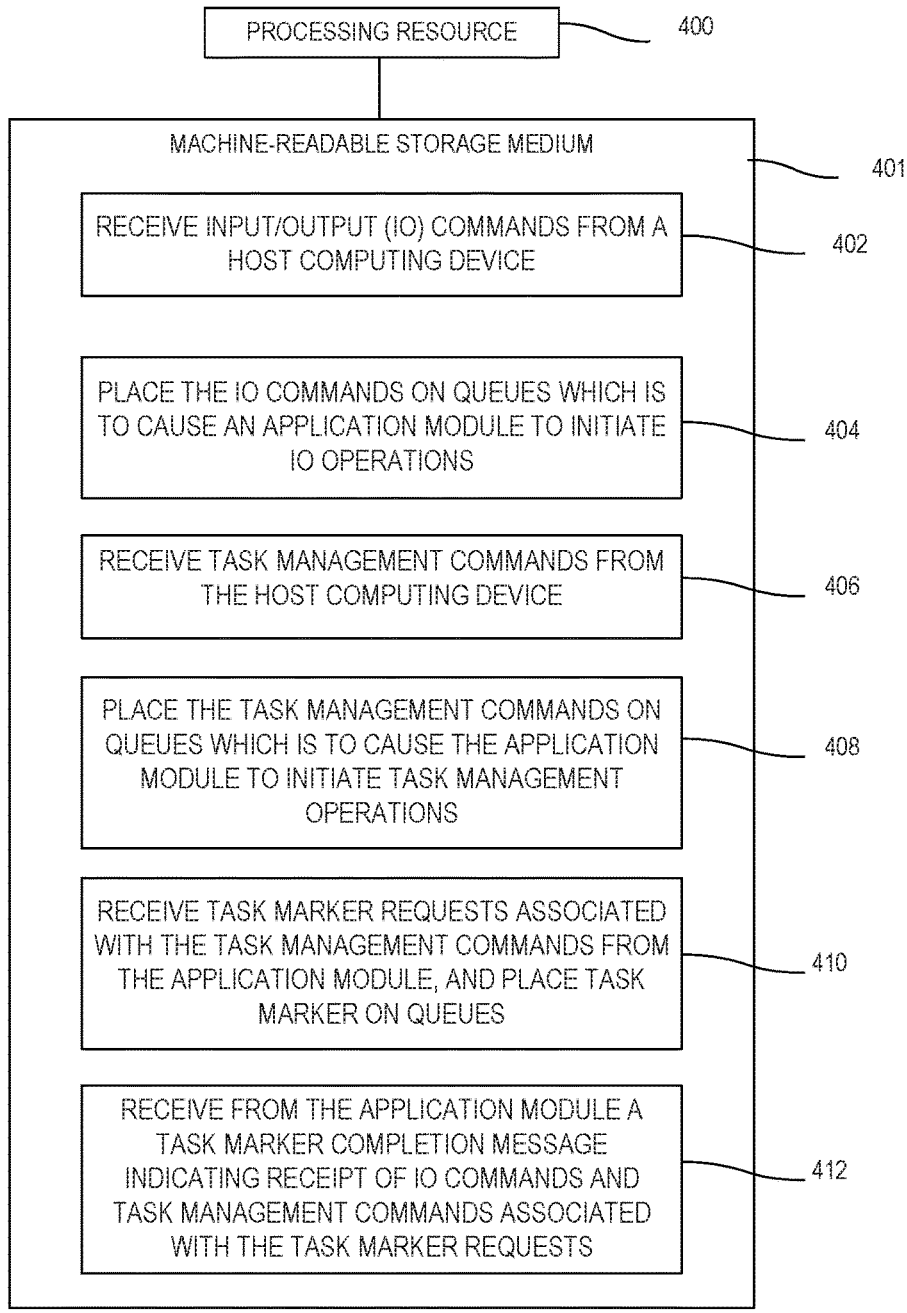
FIG. 4A depicts an example block diagram showing a non-transitory, machine readable medium that stores instructions for task management.

FIG. 4A is an example block diagram showing a non-transitory, machine readable medium that stores instructions for operation in accordance with an example of the techniques of the present disclosure. The non-transitory, machine readable medium is generally referred to by the reference number 401 and may be included in the system in relation to FIG. 1. The non-transitory, machine readable medium 401 may correspond to any typical storage device that stores processor implemented instructions, such as programming code or the like. For example, the non-transitory, machine readable medium 401 may include one or more of a non-volatile memory, a volatile memory, and/or one or more storage devices. Examples of non-volatile memory include, but are not limited to, Electrically Erasable Programmable Read Only Memory (EEPROM) and Read Only Memory (ROM). Examples of volatile memory include, but are not limited to, Static Random Access Memory (SRAM), and Dynamic Random Access Memory (DRAM). Examples of storage devices include, but are not limited to, hard disk drives, compact disc drives, digital versatile disc drives, optical drives, and flash memory devices.

A processing resource 400 generally retrieves and executes the instructions stored in the non-transitory, machine readable medium 401 to perform the present techniques in accordance with an example. In one example, machine readable medium 401 can be accessed by processing resource 400 over a bus.

The non-transitory, machine readable medium 401 may include instructions to perform functionality as described herein.

For example, block 402 provides instructions to, in response to receipt, at a target interface module 108, IO commands from a host computing device 102, place the IO commands on respective queues 112 from a plurality of queues which is to cause an application module to initiate IO operations.

For example, block 404 provides instructions to, in response to receipt of task management commands from host computing device 102, place the task management commands on respective queues 112 which is to cause application module 118 to initiate task management operations including sending task marker requests to the target interface module 108.

For example, block 406 provides instructions to, in response to receipt of task marker requests associated with the task management commands from application module 118, place task marker on respective queues.

For example, block 408 provides instructions to, in response to receipt, from application module 118 of a task marker completion message indicating receipt of IO commands and task management commands.

The blocks of FIG. 4A show example blocks and it should be understood that other instructions may be employed to practice the techniques of the present disclosure. For example, these techniques may process task management commands from a plurality of host computing devices 102 to communicate with a plurality of storage devices 106.

Although shown as contiguous blocks, the software components can be stored in any order or configuration. For example, if the non-transitory, machine readable medium 401 is a hard drive, the software components can be stored in non-contiguous, or even overlapping, sectors.

As used herein, processing resource 400 may include processor resources such as at least one of a processor Central Processing Unit (CPU), a semiconductor-based microprocessor, a Graphics Processing Unit (GPU), a Field-Programmable Gate Array (FPGA) configured to retrieve and execute instructions, other electronic circuitry suitable for the retrieval and execution instructions stored on a machine readable medium, or a combination thereof. The processor fetches, decodes, and executes instructions stored on medium 401 to perform the functionalities described below. In other examples, the functionalities of any of the instructions of medium 401 may be implemented in the form of electronic circuitry, in the form of executable instructions encoded on a machine readable storage medium, or a combination thereof.

As used herein, a machine readable medium 401 may be any electronic, magnetic, optical, or other physical storage apparatus to contain or store information such as executable instructions, data, and the like. For example, any machine readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine readable medium described herein may be non-transitory. In examples described herein, a machine readable medium or media may be part of an article (or article of manufacture). An article or article of manufacture may refer to any manufactured single component or multiple components. The medium may be located either in the system executing the machine readable instructions, or remote from but accessible to the system (e.g., via a computer network) for execution. In the example of FIG. 4A, medium 401 may be implemented by one machine readable medium, or multiple machine readable media.

Figure 4B:
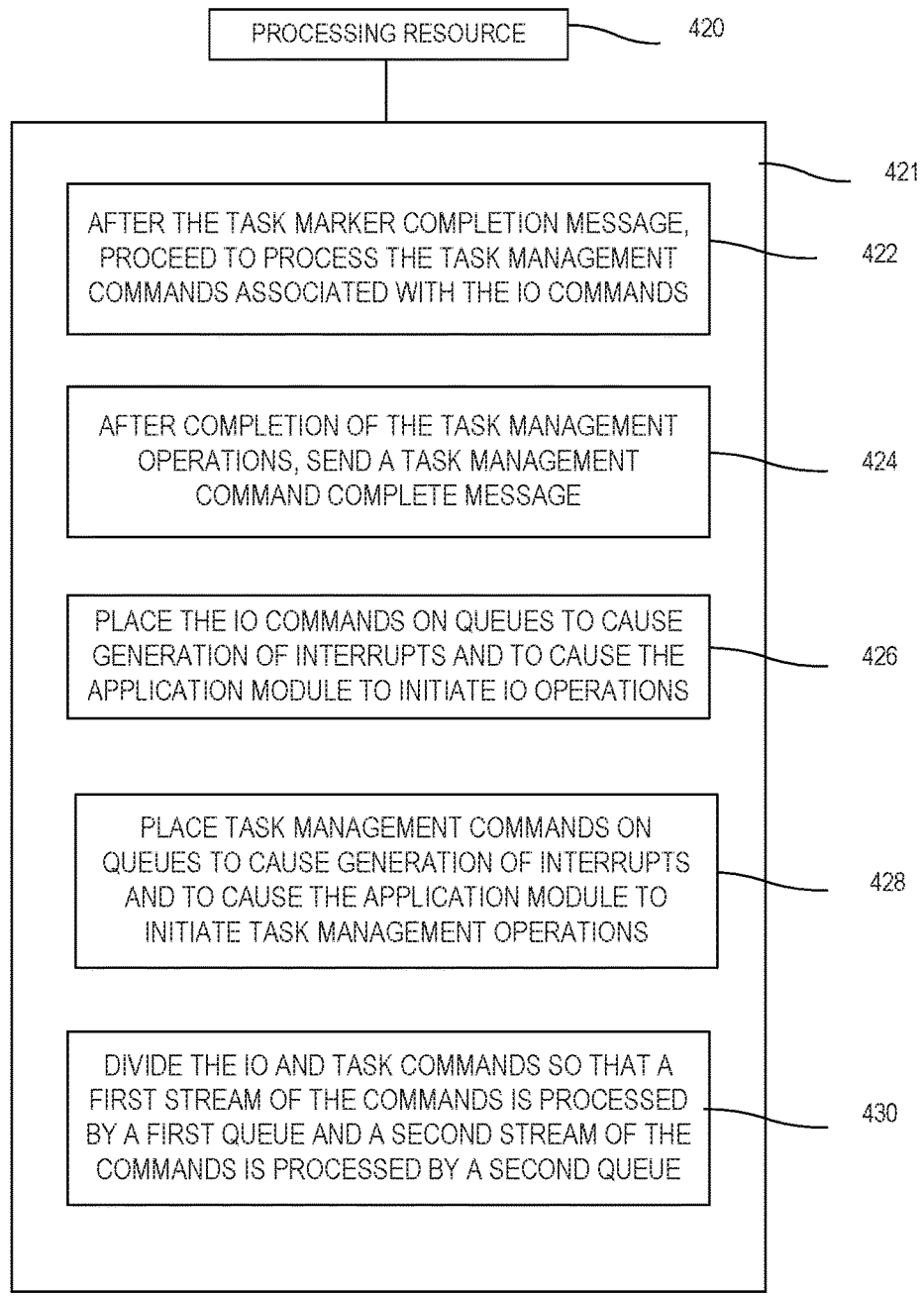
FIG. 4B depicts another example block diagram showing a non-transitory, machine readable medium that stores instructions for task management.

FIG. 4B is an example block diagram showing a non-transitory, machine readable medium that stores instructions for operation in accordance with an example of the techniques of the present disclosure. The non-transitory, machine readable medium is generally referred to by the reference number 421 and may be included in the system in relation to FIG. 1.

A processing resource 420 generally retrieves and executes the instructions stored in the non-transitory, machine readable medium 421 to perform the present techniques in accordance with an example. In one example, machine readable medium 401 can be accessed by processing resource 420 over a bus.

The non-transitory, machine readable medium 421 may include instructions to perform functionality as described herein. For example, machine readable medium 421 may include blocks of FIG. 4A and are not repeated here for simplicity.

The non-transitory, machine readable medium 421 may include instructions to perform functionality as described herein.

For example, block 422 provides instructions to, after application module 118 sends the task marker completion message, application module 118 to proceed to process the task management commands associated with the IO commands.

For example, block 424 provides instructions to, after application module 118 completes the task management operations associated with the IO commands, application module 118 sends to target interface module 108 a task management command complete message.

For example, block 426 provides instructions to place the IO commands on respective queues 112 which is to cause generation of interrupts to respective processors of plurality of processors 116 and to cause application module 118 to initiate IO operations.

For example, block 428 provides instructions to place the task management commands on respective queues of a plurality of queues 112 which is to cause generation of interrupts to respective processors of a plurality of processors 116 and to cause application module 118 to initiate task management operations.

For example, block 430 provides instructions to receive the IO commands as a stream of commands and then divide the commands so that a first stream of the commands is processed by a first queue and a second stream of the commands is processed by a second queue.

The blocks of FIG. 4B show example blocks and it should be understood that other instructions may be employed to practice the techniques of the present disclosure. For example, these techniques may process task management commands from a plurality of host computing devices to communicate with a plurality of storage devices 106.

The foregoing describes a novel and previously unforeseen approaches. While the above disclosure has been shown and described with reference to the foregoing examples, it should be understood that other forms, details, and implementations may be made without departing from the spirit and scope of this disclosure.

What is claimed is:

1. A target computing device comprising:
a queue module comprising a plurality of queues;
a processor module comprising a plurality of processors; and
a target interface module to:
in response to receipt, from a host computing device, of Input/Output (IO) commands to perform IO operations between the host computing device and a storage device, place the IO commands on respective queues which is to cause generation of interrupts to respective processors and to cause an application module to initiate IO operations,
in response to receipt, from the host computing device, of task management commands to perform task management operations, place the task management commands on respective queues which is to cause interrupts to respective processors and to cause the application module to initiate task management operations including to send task marker requests to the target interface module,
in response to receipt, from the application module, of the task marker requests associated with the task management commands, place corresponding task marker on respective queues, and
receive, from the application module, a task marker completion message indicating receipt of IO commands and task management commands associated with the task marker requests.

2. The target computing device of claim 1, further comprising, after the application module sends the task marker completion message, the application module to proceed to process the task management commands associated with the IO commands.

3. The target computing device of claim 1, further comprising, after the application module completes the task management commands associated with the IO commands, the application module sends to the interface module a task management command complete message.

4. The target computing device of claim 1, wherein the target interface module is to receive, from the host computing device, IO commands that include at least one of an read command to cause the application module to read data from the storage device and return the data to the host computing device, and an write command to cause the application module to write data from the host computing device to the storage device.

5. The target computing device of claim 1, wherein the target interface module is to receive the IO commands and the task management commands as a stream of commands and then divide the commands so that a first stream of the commands is processed by a first queue and a second stream of the commands is processed by a second queue.

6. The target computing device of claim 1, wherein the task management commands comprises commands to perform operations associated with the IO commands.

7. The target computing device of claim 1, wherein the target interface module comprises a host bus adapter to interface IO commands between the host computing device and the storage device.

8. A method comprising:
receiving, at a target interface module, Input/Output (IO) commands from a host computing device and placing the IO commands on respective queues from a plurality of queues which is to cause an application module to initiate IO operations;
receiving task management commands from the host computing device and placing the task management commands on respective queues which is to cause the application module to initiate task management operations including sending task marker requests to the target interface module;
placing task marker on respective queues responsive to task marker requests associated with the task management commands from the application module; and
receiving a task marker completion message indicating receipt of IO commands and task management commands associated with the task marker requests.

9. The method of claim 8, further comprising, after the application module sends the task marker completion message, the application module to proceed to process the task management commands associated with the IO commands.

10. The method of claim 8, further comprising, after the application module completes the task management operations associated with the IO commands, the application module sends to the interface module a task management command complete message.

11. The method of claim 8, further comprising placing the IO commands on respective queues which is to cause generation of interrupts to respective processors of a plurality of processors and to cause the application module to initiate IO operations.

12. The method of claim 8, further comprising placing the task management commands on respective queues of a plurality of queues which is to cause generation of interrupts to respective processors of a plurality of processor and to cause the application module to initiate task management operations.

13. The method of claim 8, further comprising receiving the IO commands as a stream of commands and then dividing the commands so that a first stream of the commands is processed by a first queue and a second stream of the commands is processed by a second queue.

14. The method of claim 8, further comprising receiving the task management commands to perform operations associated with the IO commands.

15. A non-transitory machine readable medium having processor executable instructions stored thereon, instructions are executable by a processor to:
in response to receipt, at an target interface module, Input/Output (IO) commands from a host computing device, place the IO commands on respective queues from a plurality of queues which is to cause an application module to initiate IO operations;
in response to receipt of task management commands from the host computing device, place the task management commands on respective queues which is to cause the application module to initiate task management operations including sending task marker requests to the target interface module;
in response to receipt of task marker requests associated with the task management commands from the application module, place task marker on respective queues; and
in response to receipt, from the application module of a task marker completion message indicating receipt of IO commands and task management commands associated with the task marker requests, the application module to continue to perform task management operations.

16. The non-transitory machine readable medium of claim 15, further comprising instructions that if executed cause a processor to:
after the application module sends the task marker completion message, the application module to proceed to process the task management commands associated with the IO commands.

17. The non-transitory machine readable medium of claim 15, further comprising instructions that if executed cause a processor to:
after the application module completes the task management operations associated with the IO commands, the application module send to the interface module a task management command complete message.

18. The non-transitory machine readable medium of claim 15 further comprising instructions that if executed cause a processor to:
place the IO commands on respective queues which is to cause generation of interrupts to respective processors of a plurality of processors and to cause the application module to initiate IO operations.

19. The non-transitory machine readable medium of claim 15 further comprising instructions that if executed cause a processor to:
place the task management commands on respective queues of a plurality of queues which is to cause generation of interrupts to respective processors of a plurality of processors and to cause the application module to initiate task management operations.

20. The non-transitory machine readable medium of claim 15 further comprising instructions that if executed cause a processor to:
receive the IO commands as a stream of commands and then divide the commands so that a first stream of the commands is processed by a first queue and a second stream of the commands is processed by a second queue.

* * * * *